Figure 1:
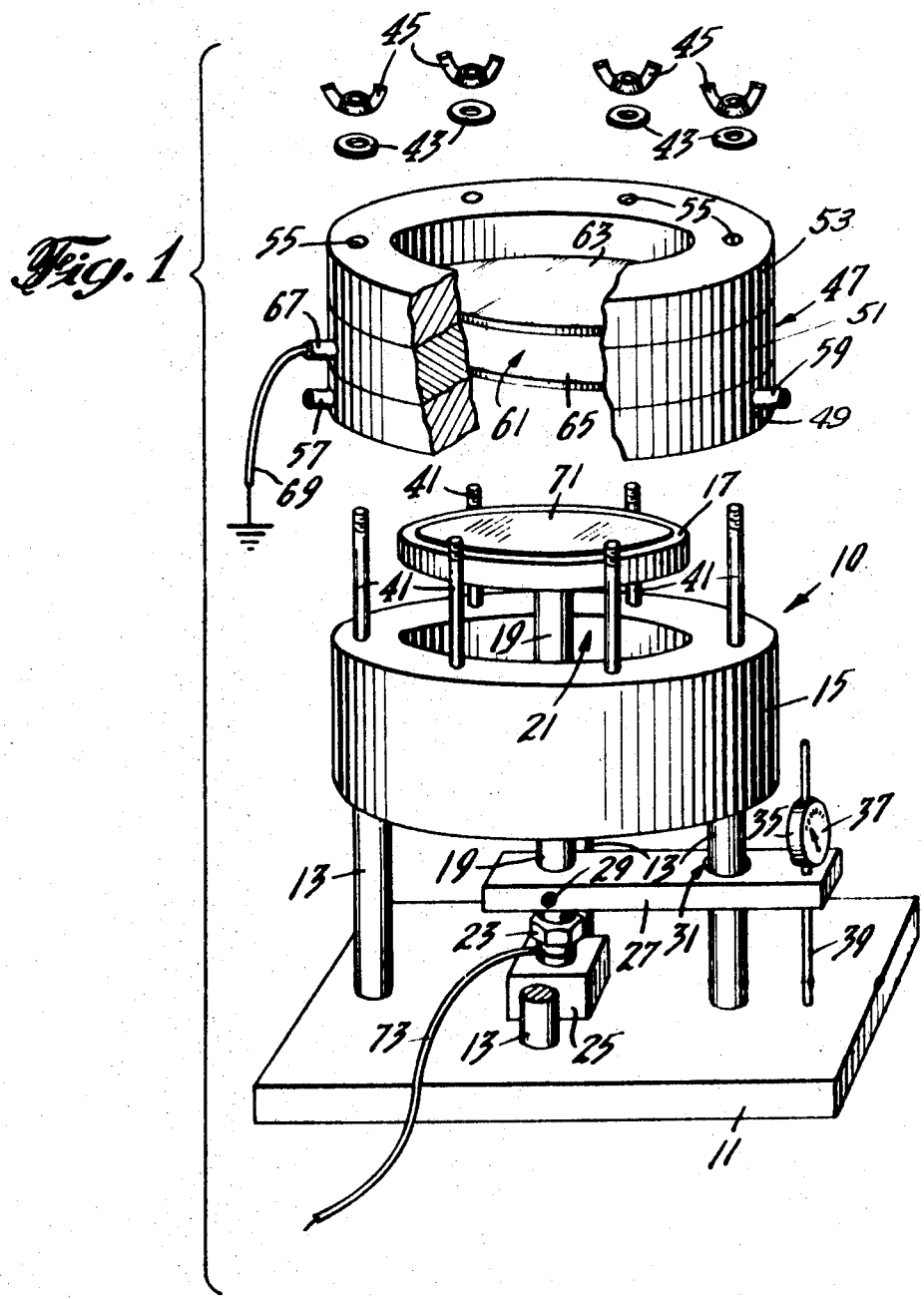

United States Patent

[11] 3,617,365

| [72] | Inventor | Charles Donald Fisher<br>Princeton, N.J. |
|---|---|---|
| [21] | Appl. No. | 855,786 |
| [22] | Filed | Mar. 25, 1969<br>Division of Ser. No. 587,827, Oct. 19, 1966, Pat. No. 3,457,156 |
| [45] | Patented | Nov. 2, 1971 |
| [73] | Assignee | American Can Company<br>New York, N.Y. |

[54] COMPOSITE COATED WITH ACETYLENE-OXYGEN POLYMERS
4 Claims, 2 Drawing Figs.

[52] U.S. Cl. .................................................. 117/132,
117/161
[51] Int. Cl. ..................................................... B32b 15/08
[50] Field of Search........................................... 117/132 B,
161 H; 260/94.1

[56] References Cited
UNITED STATES PATENTS

| 1,924,979 | 8/1933 | Calcott et al. | 260/94.1 X |
| 2,751,628 | 6/1956 | Carpenter et al. | 260/94.1 |
| 3,103,459 | 9/1963 | Kane | 117/161 X |
| 3,155,644 | 11/1964 | Kehr | 117/132 X |
| 3,211,714 | 10/1965 | Hoffman | 260/94.1 |
| 3,300,456 | 1/1967 | Hay | 260/94.1 X |

FOREIGN PATENTS

| 728,635 | 2/1966 | Canada | 260/94.1 |
| 1,158,272 | 3/1961 | Germany | 260/94.1 |

OTHER REFERENCES
" Polymers and Oxidizable Unsaturation," Penn, Aug., 1947, pps. 277 to 281

Primary Examiner—William D. Martin
Assistant Examiner—Harry J. Gwinnell
Attorneys—Kenneth H. Murray, Robert P. Auber, Leonard R. Kohan and Frank J. Jordan ABSTRACT: A composition and composite article are disclosed, including process for their production, involving the provision on a conductive or dielectric substrate of a coating made up primarily of polyacetylene, deposited with use of an electrical discharge from an atmosphere of acetylene and then oxygenated, the oxygenated polymer being chemically inert and having a high decomposition temperature.

INVENTOR
CHARLES DONALD FISHER

BY *L. R. Kohan*
ATTORNEY

INVENTOR
CHARLES DONALD FISHER

COMPOSITE COATED WITH ACETYLENE-OXYGEN POLYMERS

This application is a division of my application, Ser. No. 587,827, filed Oct. 19, 1966, now U.S. Pat. No. 3,457,156.

The present invention relates to a process for preparing films of oxidized polyacetylene and to the films produced by this process.

In the manufacture of containers, for example, metal cans, it is desirable to coat the interior thereof with a barrier layer to protect the metal from corrosion and the can contents from possible contamination. A preferred coating material would be one that is odorless, relatively chemically inert and capable of easy application into strong thin films.

The chemical inertness of most high molecular weight polyacetylenes makes them suitable candidates for protective or barrier coatings. This very inertness, however, makes it difficult to form the coatings on substrates by the usual coating techniques.

It is, therefore, an object of the present invention to produce a coated substrate, wherein the coating exhibits a high degree of chemical inertness.

It is a further object of the present invention to coat a substrate with a polymer which cannot be coated by any of the usual coating techniques.

Another object of the present invention is to provide a process for forming a polyacetylene coating on a substrate directly from the monomer.

Numerous other objects and advantages of the invention will be apparent as it is better understood from the following description which, taken in connection with the accompanying drawings, discloses a preferred embodiment thereof.

The above objects are accomplished by introducing a substrate into a deposition apparatus between two electrodes. If the substrate is electrically conductive, it may serve as one electrode. An atmosphere of acetylene, of a predetermined pressure, is established in the apparatus. By means of an electrical discharge between the electrodes, polyacetylene is deposited on the substrate. Thereafter the polyacetylene may be oxidized by appropriate exposure to oxygen.

Figure 2:
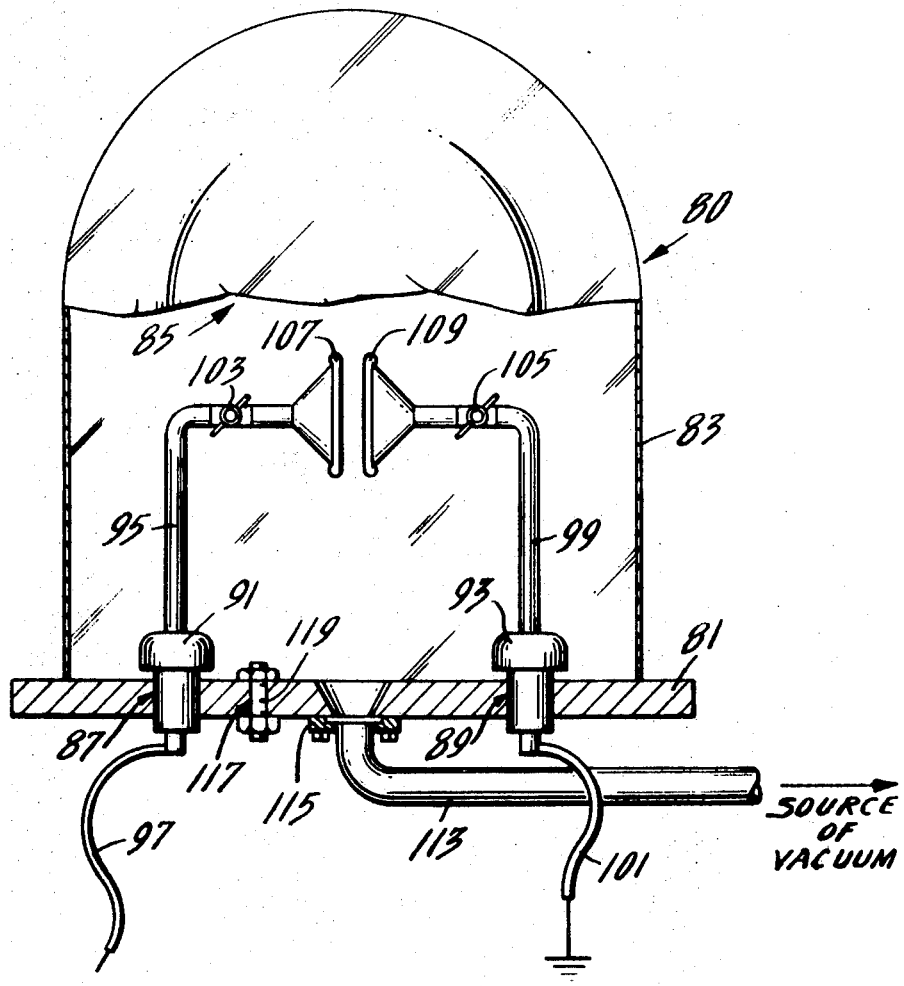

Referring to the drawings:

FIG. 1 is a perspective view, partially in section, showing an apparatus for use in depositing polyacetylene coatings at atmospheric pressure; and FIG. 2 is a schematic elevational view of a deposition apparatus suitable for depositing polyacetylene coatings at low pressures.

As a preferred or exemplary embodiment of the instant invention, acetylene is polymerized onto a substrate in an electric discharge and the resulting coating further polymerized and oxidized to give a uniform, odorless, pale yellow to brown coating. The substrate being coated may be either metallic or nonmetallic, or both metallic and nonmetallic substrates may be coated simultaneously.

Referring to FIG. 1, the deposition apparatus 10, a flat plate reactor, comprises a nonconductive base plate 11 upon which there are mounted four vertical supporting legs 13. The legs 13 evenly support the deposition apparatus bottom chamber 15 which is made of electrically nonconductive or insulating material and within which there is mounted a disc-shaped platform 17. The platform 17 is supported on a vertically adjustable metal shaft 19 and is adapted to be raised and lowered within the space 21, in the chamber 15 by means of a screw jack 23. The shaft 19 is journaled in a sealing means, not shown, to facilitate evacuation of the space 21.

The screw jack 23 is supported on a block of electrically insulating material 25 on the base plate 11 and has the end of the shaft 19 mounted directly thereon. Attached to the shaft 19 and projecting horizontally therefrom is an arm 27 which is attached to the shaft 19 by means of a locking screw 29. The arm 27 has an aperture 31 therein through which one of the supporting legs 13 passes. The leg 13 passing through the aperture 31 in the arm 27 prevents any horizontal swinging of the arm 27 as the screw jack 23 is rotated. The arm 27 is made of an electrically insulating material, such as plastic, in order to isolate the shaft 19 and platform 17.

Disposed at the end of the arm 27 is an indicating means 33 which is used to measure the height of the platform 17. The indicator comprises a housing 35 having an indicating dial 37 on one face thereof. Depending from the housing 35 is a pin 39 which rests upon the base plate 11. Vertical movement of the arm 27 causes the pin 39 to move relative to the housing 35 which in turn causes the dial 37 to indicate the height of the platform 17.

A plurality of vertically upstanding head bolts 41 are disposed about the upper surface of the bottom chamber 15. The head bolts 41 in combination with washers 43 and wing nuts 45 are employed to hold the deposition chamber head 47 in sealed position on the bottom chamber 15.

The chamber head 47 is made up from a plurality of vertically disposed rings 49, 51 and 53, respectively. Each of the rings has a plurality of spaced apertures 55 therein through which the head bolts 41 pass.

The lower spacing ring 49, of the head 47, has a pair of pipes 57 and 59 horizontally disposed therethrough. The pipes 57 and 59 serve as gas inlet and exit ports, respectively, for the space 21 within the deposition apparatus 10.

The ring 51 defines the outer boundary of a cell 61 which has glass platen 63 and 65 defining the upper and lower walls thereof, respectively. The cell 61 is filled with an electrically conductive aqueous salt solution, for example, sodium chloride solution. An electric terminal member 67 is disposed through the ring 51 and provides electrical contact with the salt solution. The terminal 67 is electrically coupled by means of a lead 69 to a point of reference potential, indicated as ground.

The upper compression ring 53 forms a surface against which the washers 43 and wing nuts 45 can be securely tightened in enclosing the space 21 and also holds the cell 61 in position.

The platform 17 provides an adjustable support for the lower electrode of the electrical discharge system. A metal substrate 71, for example, a can top, shown disposed on the platform 17 serves as the lower electrode and is coated by the polyacetylene during the electrical discharge reaction. Since the platform 17 is adjustable, the electrical discharge within the apparatus can be varied in accordance with the acetylene pressure.

The cell 61 provides the upper electrode for the electrical discharge reaction. The glass plate 65, or any other insulating sample plate used to seal the bottom of the cell 61, is coated with polyacetylene during the electrical discharge reaction.

The deposition apparatus which in FIG. 1 is preferred for use at pressure above 100 mm. of mercury with a nonmetallic (nonconducting) —metallic electrode system. The nonconducting electrode can be glass, plastic or other nonconductor with the salt solution behind the nonconducting sample serving as the conductor. The lower electrode sample rides on the movable platform which can be raised or lowered to the desired electrode separation. This electrode is connected by lead 73 to a high voltage high-frequency generator which is not shown.

Although the apparatus for carrying out the deposition coats individual substrate articles, it is readily apparent that modifications may be made in the equipment to continuously coat strip material. Such equipment is well known to those skilled in the art.

In operating the deposition apparatus shown in Fig. 1, the chamber is first flushed with acetylene, and closed off, the desired pressure established, and the electric discharge initiated. A continuous stream of acetylene can be admitted to the chamber during the electrical discharge to maintain any desired pressure. The discharge between the electrodes causes a polymer coating to form on both the upper and lower electrodes. For any set of electrical parameters the time of the discharge and the gas pressure determines the thicknesses of the coatings.

Upon completion of the deposition, the polyacetylene coated samples are allowed to sit in the air for several hours to oxidize and polymerize further. The oxidation-polymerization process may be accelerated by heating the samples or by bringing hot air or oxygen into contact with the coatings.

A 0.0002 inch thick coating of polyacetylene prepared from pure acetylene oxidizes to a tough, odorless polymer in an oven at 110° C. in less than 15 minutes. The coatings which are laid down may be of any thickness that the electrode separation will permit, such as 0.0002 inch, but thin coatings from 0.1 to 10 microns are particularly easily formed.

Referring now to FIG. 2, there is shown an electric discharge reaction chamber, indicated generally as 80, used primarily for metal—metal electrode systems at pressures lower than 100 mm. of mercury. The reaction chamber comprises a metal baseplate 81 with a glass bell jar 83 mounted thereon which defines a space 85 within which the electric discharge reaction takes place.

The baseplate 81 has a pair of apertures 87 and 89 therein through which are mounted a pair of electrical feedthrough insulators 91 and 93, respectively. Passing through insulator 91 is an electrode support 95 which is coupled by a lead 97 to a high voltage, high-frequency generator, not shown. Passing through insulator 93 is an electrode support 99 which is coupled by a lead 101 to a source of reference potential indicated as ground.

Electrode supports 95 and 99 have adjustable clamps 103 and 105, respectively, which permit variable spacing of the sample electrodes 107 and 109, respectively.

The baseplate 81 has an aperture 111 therein which is coupled by a hose 113 to a vacuum pump, not shown. The hose 113 is clamped to the plate 81 by a hose clamp 115. The baseplate 81 has an additional aperture 117 therein through which there is mounted a gas inlet pipe 119. The gas inlet pipe 119 has means secured thereto (not shown) to provide a gas tight seal about the pipe 119.

In operating the electric discharge reaction chamber as shown in FIG. 2, the bell jar is flushed with acetylene by repeatedly evacuating the jar and bringing the pressure back to atmospheric with acetylene. The vacuum system is shut off when the bell jar has been thoroughly flushed and the desired reaction pressure of acetylene established. The electrical discharge is then initiated between the electrodes and the electrical parameters are varied as needed to maintain a good even discharge. The electrical discharge between the metal samples is luminous and may be readily observed in a darkened room. As the samples are coated with polyacetylene, the pressure of the acetylene gas decreases. The pressure may be maintained or increased by adding more acetylene. After the desired thickness of coating is laid down, the electrical discharge is discontinued and the bell jar is brought to atmospheric pressure. The coatings are then oxidized, as discussed previously with regard to the operation of the apparatus shown in FIG. 1, to yield oxidized polyacetylene.

The voltage generator used with each of the electrical discharge apparatus has an adjustable output up to 20 kv. The voltages for experiments at atmospheric pressure are less than 20 kv. Experiments conducted near 1 mm. of mercury pressure have a potential difference between the electrodes of less than 1 kv.

The frequency of the voltage generator may be adjustable from 60 cycles/second to 10,000 cycles/second. Higher frequencies allow one to supply more energy to the reaction per period of time, and hence, the process of coating has a tendency to be accelerated by increasing the frequency. Numerous experiments have been carried out at 1,440 cycles/second. However, other frequencies may also be used without departing from the spirit and scope of the invention.

When acetylene is polymerized by an electric discharge in the absence of air a solid resin is formed. This resin somewhat resembles the acetylene polymer known as "cuprene," however, unlike cuprene, this polymer is quite reactive towards oxygen. The nature of the reaction of the polymer with oxygen is not fully understood, but it is known that both carbonyl and hydroxyl groups are formed, the oxygen in both cases being carried in pendant substituents on the polymeric molecule.

The oxygenated polymer is substantially chemically inert and heat-stable, having a high decomposition point. The composition of a typical sample of the polymer is $(C_4H_4O)_n$, where $n$ is a positive integer greater than 6. With this composition it thus appears that the acetylene has not been deprived of hydrogen upon incorporation in the polymeric chains, so that the oxygenated polyacetylene has substantially as many hydrogen atoms as there are carbon atoms in the polymeric molecule, which also carries at least approximately one oxygen atom for every four carbon atoms. Moreover, the empirical formula indicates that the oxygenated polymeric molecules have an average molecular weight of at least 476. The invention is, of course, not limited to polymers with this exact formula.

The substrates which are coated can be flat webs or formed objects. When a discharge takes place between two electrodes (either or both can be covered by a nonmetallic substrate) in an atmosphere of acetylene, "active" polyacetylene is formed. When alternating current is used (direct current can be used, but relatively high frequency alternating current is preferred) both electrodes are coated with yellow to brown resin. In the case when both electrodes are parallel flat plates, a very uniform coating is obtained on each electrode. This initially formed polymer is usually odoriferous but loses its odor when heated in an oven in the presence of air (oxygen) or when allowed to sit in the air for several hours.

The following examples are representative of the process and of the film produced by the present invention. In carrying out the experiments the apparatus of FIG. 1 or FIG. 2 were used, however, it must be remembered that these are only representative of many suitable types of apparatus capable of being used in the process.

EXAMPLE I

A 5-mil-thick tin foil substrate was coated with polyacetylene using the flat plate reactor described in FIG. 1. The distance between the electrodes was 0.055 inch. The discharge voltage was 12 kv; the current was less than 40 ma. at 1,440 cyc./sec. An initial acetylene pressure of 510 mm. Hg fell to 420 mm. Hg as acetylene was consumed during the polymerization.

The polyacetylene formed on the tin substrate was initially very odoriferous but oxidized rapidly to give an odorless golden film. The polymer was insoluble in common organic solvents.

EXAMPLE II

A 10.5-mil-thick aluminum sheet was coated with polyacetylene using the flat plate reactor described in FIG. 1. The distance between the electrodes was 0.050 inch. The discharge voltage was 12 kv; the current was less than 50 ma. at 1,440 cyc./sec. An initial acetylene pressure of 760 mm. Hg (atmospheric) was permitted to fall to 685 mm. Hg during the course of the reaction.

The polyacetylene formed on the aluminum was initially very odoriferous but oxidized rapidly to give an odorless film. The golden film was uniform, continuous, and insoluble in common solvents.

EXAMPLE III

An 8-mil-thick can makers (CMQ) blackplate sample, i.e., tin free low carbon steel, was coated with polyacetylene using the flat plate reactor described in FIG. 1. The distance between the electrodes was 0.050 inch. The discharge voltage was 13 kv.; the current was less than 15 mm. at 1,440 cyc./sec. An initial acetylene pressure of 405 mm. Hg was permitted to fall to 305 mm. Hg during the course of the reaction.

The polyacetylene formed on the blackplate was initially very odoriferous but oxidized rapidly to give an odorless film. The golden film, was about 0.2 mil thick, continuous, quite uniform and smooth, and insoluble in common solvents. The coated blackplate sample resisted corrosion (rust).

EXAMPLE IV

Acetylene was polymerized on the surface of two 1 mil aluminum foil samples using the bell jar reactor described in FIG. 2. The discharge between the electrodes was 0.5 inch. The discharge voltage was less than 1 kv.; the 1,440 cyc./sec. current was less than 10 ma. The pressure of the acetylene was kept between 1 and 5 mm. Hg during the course of the reaction.

The polyacetylene formed on the samples was initially slightly odoriferous but rapidly oxidized to give an odorless film. The copper color coatings were quite uniform and insoluble in common solvents.

The polyacetylene films produced by the electrical discharge reaction can be tailored by the addition of selected additives to thereby improve particular properties of the film. The particular additive selected is added to the acetylene being polymerized and can constitute up to one-half the total gas volume being polymerized. For example, the addition of acetone to acetylene can be achieved by bubbling the acetylene gas through the acetone and adding this acetone-acetylene vapor to the stream of acetylene. The particular method of mixing the additive and acetylene forms no part of the present invention.

In the following table a list of additives is presented along with an indication of the effect produced by the additive:

CHANGES IN OXIDIZED POLYACETYLENE COATINGS BROUGHT ABOUT BY MODIFIER

| Modifier | Improved adhesion | Improved continuity | Modified chemical properties | Imrpoved appearance | Improved flexibility |
| --- | --- | --- | --- | --- | --- |
| Methane | X | | | | |
| Acetone | | X | | X | |
| Ethylene | X | | | | X |
| Mesitylene | | | | X | |
| Propylene | X | | | | |
| Vinyl chloride | | | X | | |
| Methyl acetylene | X | | | | |
| Ethyl acetylene | X | X | X | X | X |
| Vinyl acetate | | | X | X | |
| Styrene | X | | | | |
| Isobutylene | X | X | X | X | X |
| Ethylene oxide | X | X | X | X | X |
| Helium | | | | X | |

The following examples are representative of the process and films produced using various additives:

EXAMPLE V

Acetylene, with 40 percent by volume ethyl acetylene added, was polymerized in the flat plate reactor (FIG. 1) to obtain a polymer coating on 8-mil-thick CMQ blackplate. The distance between the electrodes was 0.050 inch. The discharge voltage was 13 kv.; the current was less than 20 ma. at 1,440 cyc./sec. An initial reactant pressure of 405 mm. Hg was permitted to fall to 340 Hg during the course of the reaction.

The modified polyacetylene formed on the blackplate was initially tacky and very odoriferous but oxidized rapidly to give an odorless, glassy, light yellow film. The approximately 0.2 mil coating was evenly distributed over the sample and protected the blackplate from corrosion (rust).

EXAMPLE VI

Acetylene, with 25 percent by volume isobutylene added, was polymerized in the flat reactor (FIG. 1) to obtain a polymer coating on 8-mil-thick CMQ blackplate. The distance between the electrodes was 0.050 inch. The discharge voltage was 13 kv.; the current was less than 10 ma. at 1,440 cyc./sec. An initial reactant pressure of 410 mm. Hg was allowed to fall to 360 mm. Hg during the course of the reaction.

The modified polyacetylene formed on the blackplate was initially quite tacky and odoriferous but oxidized rapidly to give a clear glassy, pale yellow film which had only a slight odor. The polymer was soluble in acetone. The coating adhered very well to the blackplate and was flexible.

EXAMPLE VII

Acetylene, saturated with vinyl acetate vapors at room temperature was polymerized in the flat plate reactor (FIG. 1) to obtain a polymer coating on 8-mil-thick CMQ blackplate. The distance between the electrodes was 0.050 inch. The discharge voltage was 13 kv.; the current was less than 30 ma. at 1,440 cyc./sec. An initial reactant pressure of 510 mm. Hg was allowed to fall to 410 mm. Hg during the course of the reaction.

The modified polyacetylene formed on the blackplate was initially tacky and had a very strong odor. It oxidized rapidly to give a clear, glossy golden film which had only a very slight odor. The coated blackplate sample resisted corrosion (rust).

EXAMPLE VIII

Acetylene, saturated with allyl acrylate vapors at room temperature was polymerized in the flat plate reactor, (FIG. 1) to obtain a polymer coating on 8-mil-thick CMQ blackplate. The distance between the electrodes was 0.050 inch. The discharge voltage was 13 kv.; the current was less than 20 ma. at 1,440 cyc./sec. An initial reactant pressure of 510 mm. Hg was permitted to fall to 395 mm. Hg during the course of the reaction.

The modified polyacetylene formed on the blackplate oxidized rapidly to yield an essentially odorless coating. The golden film was somewhat brittle, about 0.2 mil thick, and offered good protection against corrosion of the blackplate.

EXAMPLE IX

An 8-mil-thick CMQ blackplate sample was coated with a tertiary amyl alcohol-chromic acid reaction product (Brit. Pat. No. 947,745). The treated blackplate was further coated with polyacetylene using the flat plate reactor described in FIG. 1. The distance between the electrodes was 0.050 inch. The discharge voltage was 13 kv.; the current was less than 20 ma. at 1,440 cyc./sec. An initial acetylene pressure of 510 mm. Hg was permitted to fall to 405 mm. Hg during the course of the reaction.

The polyacetylene formed on the treated blackplate oxidized rapidly to yield an odorless coating. The golden coating was about 0.2 mil thick, uniform, and insoluble in common solvents. Adhesion of the polymer to the treated blackplate was excellent and the polymercoated blackplate resisted corrosion.

The polymer films produced by the method of the present invention have been found to have wide ranging utility. For example the "active" polyacetylene film can be used as a "getter," to remove oxygen from static and dynamic systems such as packaged foods, vacuum tubes, gas streams, etc. The oxygenated polymer is chemically inert to common organic solvents, has a high decomposition temperature, and forms an excellent coating or barrier layer for use on metal containers, such as cans. It is possible, through the process of the present invention, to directly coat a substrate with the film providing an impervious barrier layer to protect the substrate.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. A composite article comprising a substrate, and an inert coating directly thereon between 0.1 micron and 0.002 inch thick, said coating consisting essentially of oxygenated polyacetylene having the composition $(C_4H_4O)_n$, where $n$ is positive integer greater than 6.

2. The article of claim 1, wherein the substrate is metal.

3. A composite article, comprising:

a substrate;

and an inert, heat-stable adherent coating between 0.1 micron and 0.002 inch thick directly on said substrate, said coating consisting essentially of oxygenated polyacetylene having substantially as many hydrogen atoms as carbon atoms in the polymeric molecules, and said molecules carrying at least approximately one oxygen atom in pendant substituents for every four carbon atoms and having an average molecular weight of at least 476.

4. The article of claim 3, wherein the substrate is metal.

* * * * *